June 4, 1935. H. W. ALDEN ET AL 2,003,412

PROCESS OF ASSEMBLING RESILIENT JOINTS

Filed Oct. 29, 1932

INVENTORS:
Herbert W. Alden and
Laurence R. Buckendale,
by Carolan Grively,
THEIR ATTORNEYS Patented June 4, 1935

2,003,412

UNITED STATES PATENT OFFICE 2,003,412

PROCESS OF ASSEMBLING RESILIENT JOINTS

Herbert W. Alden and Laurence R. Buckendale, Detroit, Mich., assignors to The Timken-Detroit Axle Company, Detroit, Mich., a corporation of Ohio Application October 29, 1932, Serial No. 640,236

7 Claims. (Cl. 29—84)

Our invention relates to resilient joints, particularly resilient universal joints of the type wherein a sleeve of rubber or analogous material is held under compression between the inner and outer members of the joint and allows relative movement of said members by internal deformation of the rubber. The principal object of the present invention is to devise a simple, rapid and economical process of assembling resilient joints of the type above mentioned. The invention consists in the process hereinafter described and claimed.

Figure 1:
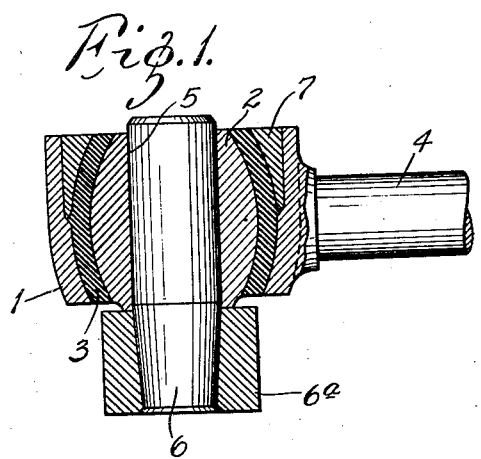
Figure 2:
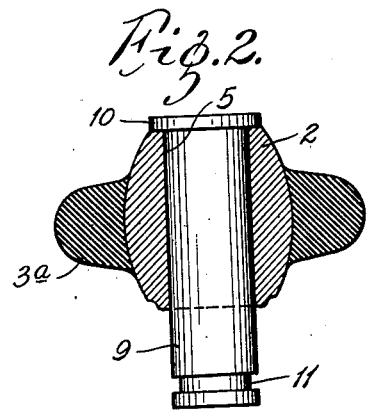
Figure 2:
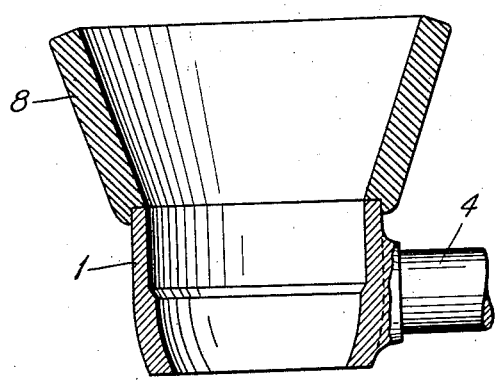
Figure 4:
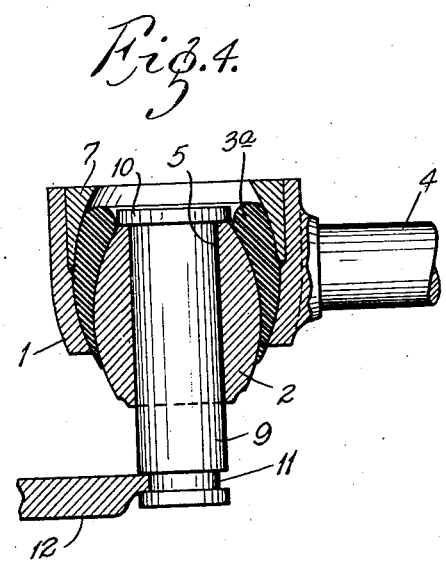
Figure 3:
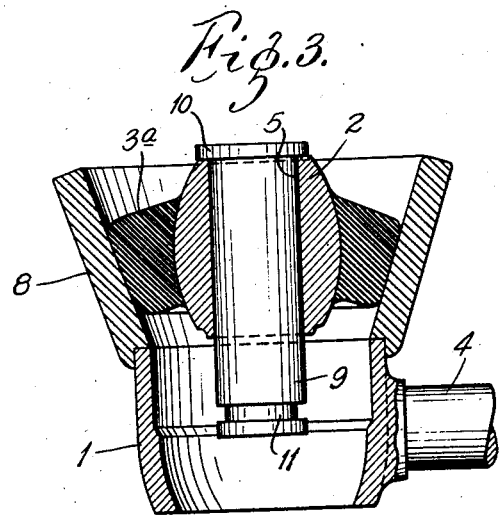

In the accompanying drawing, which forms part of this specification and wherein like symbols refer to like parts wherever they occur, Fig. 1 is a longitudinal sectional view of a resilient universal joint adapted for assembly in accordance with our process, Fig. 2 is a longitudinal section showing the parts of said joint ready for assembly, Fig. 3 is a view similar to Fig. 2 showing the rubber sleeve being forced through the loading funnel; and Fig. 4 is a similar view showing the rubber sleeve driven beyond its working position and held in such position while the retaining ring is fitted within the outer member of the joint.

The resilient universal joint construction illustrated in the accompanying drawing comprises a metallic outer member in the form of a tube or shell 1, a metallic inner member 2 within said shell and a sleeve 3 of rubber or other analogous material compressed between said outer shell and said inner member. The outer shell 1 of the joint is shown provided with a radially extending arm 4; and the inner member 2 of said joint is preferably provided with an axial bore 5 within which is press-fitted one end of a pin 6 whose opposite end is rigidly attached to a suitable fixture or arm 6a. Fitting within one end of the outer shell 1 of the joint is a wedge-shaped retaining ring 7, which is rigidly held in place preferably by being press-fitted in said outer shell. The compressed rubber sleeve 3 frictionally adheres to the outer shell 1 and is vulcanized or otherwise bonded to the inner member 2 so that relative movement of the two joint members is accommodated by the internal deformation of the rubber and not by sliding or rubbing of the rubber on said members. As shown in the drawing, the inner joint member 2 is preferably barrel-shaped in axial section; and likewise the inner surfaces of the outer joint member 1 and the retaining ring 7 have a longitudinal curvature corresponding to the longitudinal peripheral curvature of said inner joint member.

In assembling the above joint in accordance with our process, an annular mass of rubber 3a sufficient to form the rubber sleeve 3 of the finished joint is vulcanized to the peripheral surface of the inner joint member 2, a loading funnel 8 is placed upon the outer shell or joint member 1 with its small end down and in register with the retaining ring receiving end of said shell, and a plunger pin 9 is inserted in the axial bore 5 of said inner member. The plunger pin 9 is provided at one end with a circumferential flange 10, which abuts against one end of the inner joint member 2; and the other end of said pin projects beyond the other end of said inner joint member and is provided with a circumferential groove 11. The inner joint member 2 with the rubber ring 3a vulcanized thereon and with the plunger pin 9 mounted therein with its flanged end 10 uppermost is centered within the loading funnel 8 and pressure is then applied to said end of said pin to force said inner joint member and the rubber ring fixed thereto through the small end of said funnel into the outer shell or joint member 1, thereby compressing said rubber ring between said inner and outer joint members and causing it to elongate in an axial direction. A suitable lubricant is supplied to the loading funnel 8 during the operation of introducing the rubber ring 3a into the outer joint member in order to prevent gripping of said rubber ring upon the metal parts.

As shown in Fig. 4, the rubber ring 3a is driven into the outer shell 1 far enough beyond its desired position to permit the retaining ring 7 to be pressed into the end of the outer shell 1. During the operation of placing the retaining ring 7 in position, the rubber ring 3a is held crowded against the inwardly curved opposite end of the opening in the outer shell by means of a suitable fixture 12 having a bifurcated end portion which engages the annular groove 11 in the corresponding end of the plunger pin 9. After the retaining ring 7 has been fitted within the shell, the holding fixture 12 is disengaged from the plunger pin 9, thereby permitting the compressed rubber member 3a to move, expand and fill the space between the inner and outer members of the joint and take shape of the ring 3 shown in Fig. 1. The assembling plunger pin 9 is then withdrawn from the inner joint member 2 and the axial pin 6 of the finished joint is substituted for said assembling plunger pin.

While the foregoing process is particularly applicable to resilient universal joints of the type illustrated, it is also applicable to other joints; and, of course, other mechanical means may be used for crowding the rubber into the joint instead of the means shown.

What we claim is:

1. The process of assembling resilient joints comprising metallic inner and outer joint members having resilient material interposed therebetween, which comprises inserting said material between said inner and outer joint members, crowding said material endwise toward one end of said outer joint member by forcing said inner member longitudinally, mounting a retaining ring in the other end of said outer joint member while holding the material so crowded, and then releasing the pressure endwise on said material to permit the same to fill the space between said inner joint member and said retaining ring.

2. The process of assembling resilient joints comprising metallic inner and outer joint members having a sleeve of rubber compressed therebetween, which comprises mounting on said inner joint member a ring of rubber containing an amount of material sufficient to form said sleeve, forcing said inner joint member with the ring of rubber thereon endwise into said outer joint member beyond the position desired in the finished joint, inserting a retaining ring in said outer joint member, and releasing the pressure endwise on said rubber thus permitting said rubber to expand and fill the space between said inner joint member and said retaining ring.

3. The process of assembling resilient joints comprising inner and outer joint members having a sleeve of rubber compressed therebetween, which consists in fixing on said inner joint member a ring of rubber containing an amount of material sufficient to form said sleeve, forcing said inner joint member with the ring of rubber thereon into said outer joint member beyond the position desired in the finished joint, inserting a retaining ring in one end of said outer joint member and removing the endwise pressure on said inner joint member to permit it to return to normal position.

4. The process of assembling resilient joints comprising inner and outer joint members having a sleeve of rubber compressed therebetween, which consists in fixing on said inner joint member a ring of rubber containing an amount of material sufficient to form said sleeve, forcing said inner joint with the ring of rubber thereon into said outer joint member beyond the position desired in the finished joint, inserting a retaining ring in one end of said outer joint member, and releasing the pressure endwise on said rubber thus permitting said rubber to expand against said retaining ring.

5. The process of assembling resilient joints comprising inner and outer joint members having a sleeve of rubber compressed therebetween, which consists in vulcanizing to said inner joint member a ring of rubber containing an amount of material sufficient to form said sleeve, pressing said inner joint member with the ring of rubber thereon endwise into said outer joint member, crowding said sleeve toward one end of said outer joint member by continuing such endwise pressure, inserting a retaining ring in the other end of said outer joint member while maintaining such endwise pressure, and releasing the pressure endwise on said rubber thus permitting said rubber to expand and fill the space between said inner joint member and said retaining ring.

6. The method of assembling a resilient joint of the type comprising generally a metallic inner member having an approximately barrel shaped outer surface, a metallic outer member formed internally at one end to correspond to the outer surface of the corresponding end of said inner member, and a retaining ring for said outer metallic member; said members being interconnected by a resilient material which method comprises inserting said resilient material between said inner and outer members, forcing said inner member endwise toward the end of said outer member of corresponding shape, thereby crowding said material endwise, mounting a retaining ring in the other end of said outer joint member while holding the material so crowded, and then releasing the endwise pressure on said material to permit the same to fill the space between said inner joint member and said retaining ring.

7. The method of assembling a resilient joint of the type comprising generally a metallic inner member having an approximately barrel shaped outer surface, a metallic outer member formed internally at one end to correspond to the outer surface of the corresponding end of said inner member, a retaining ring for said outer metallic member and a sleeve of rubber compressed between said joint members which method comprises mounting on said inner joint member a ring of rubber containing an amount of material sufficient to form said sleeve, forcing said inner joint member with the ring of rubber thereon endwise into said outer joint member toward the end thereof corresponding in shape to said inner member beyond the position desired in the finished joint, inserting the retaining ring in said outer joint member, and releasing the pressure endwise on said rubber thus permitting said rubber to expand and fill the space between said inner joint member and said retaining ring.

HERBERT W. ALDEN.
LAURENCE R. BUCKENDALE.